Figure 2:
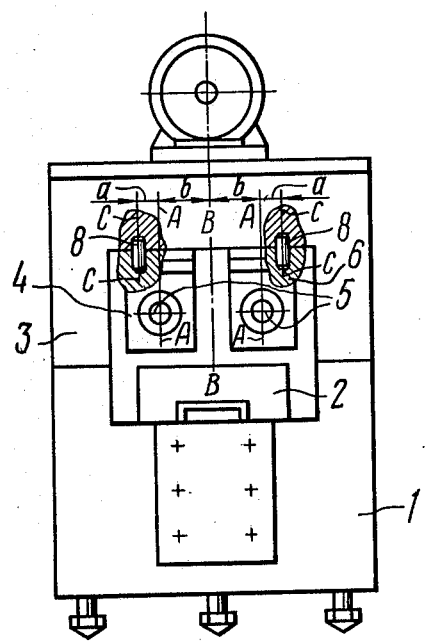

United States Patent [19]

Kopelev

[11] 4,082,476

[45] Apr. 4, 1978

[54] MACHINE FOR PRECISION BORING OPERATIONS

[76] Inventor: Fridrikh Lvovich Kopelev, ulitsa Komsomolskaya, 43, kv.5, Odessa, U.S.S.R.

[21] Appl. No.: 785,285

[22] Filed: Apr. 6, 1977

[51] Int. Cl.² .............................................. B23B 47/00
[52] U.S. Cl. ..................................................... 408/234
[58] Field of Search ......................................... 408/234

[56] References Cited

U.S. PATENT DOCUMENTS

| | | | |
|---|---|---|---|
| 1,759,388 | 5/1930 | Bockhoff | 408/234 |
| 2,028,727 | 1/1936 | Perrf et al. | 408/234 |
| 2,864,269 | 12/1958 | Mottu | 408/234 |
| 3,158,044 | 11/1964 | Jones | 408/234 |

FOREIGN PATENT DOCUMENTS

| | | | |
|---|---|---|---|
| 312,691 | 12/1971 | U.S.S.R. | 408/234 |

*Primary Examiner*—Harrison L. Hinson
*Attorney, Agent, or Firm*—Robert E. Burns; Emmanuel J. Lobato; Bruce L. Adams

[57] ABSTRACT

The invention relates to machine tool-building and can be successfully utilized in machine tools intended for finishing working of high-precision work, wherein there is necessary to maintain either precise spacing of the axes of openings being bored, or else precise spacing of these axes from the reference bases of workpieces being worked upon. The disclosed machine comprises a framework, a work table adapted to have workpieces secured thereon, mounted on the framework for displacement in the course of a boring operation, and either one or two bridge structures, mounted on the framework, each carrying at least one spindle head with a tool spindle. The housing of the spindle head is secured on the side of the respective bridge structure, facing the work table, the housing of the spindle head being attached so that the axis of the spindle is offset relative to the axis of symmetry of the bridge structure. Besides, the housing of the spindle head is retained against displacement with respect to the said side of the bridge structure by means of pins pressure-fitted in said housing. In accordance with the invention, the said pins are arranged in the housing of the spindle head so that the plane including their axes is offset relative to a parallel plane including the axis of the spindle in a direction opposite to one toward the axis of symmetry of the bridge structure. The machine offers higher precision of working than other machines of the same kind, for it compensates for temperature-induced displacement of the axes of the spindles in a direction parallel to the plane of attachment of the spindle head to the bridge structure.

4 Claims, 2 Drawing Figures

U.S. Patent April 4, 1978 4,082,476

MACHINE FOR PRECISION BORING OPERATIONS

The present invention relates to art of machine tool-building, and, more particularly, it relates to machines intended for performing high-precision boring operations.

The invention can be utilized to utmost effectiveness in machines intended for finishing working of high-precision workpieces, wherein it is necessary to ensure either precise spacing of the axes of openings being bored, or precise spacing of these axes from the reference bases of the workpieces.

The invention can be also utilized in machine tools, machines and instruments, where it is essential to precisely retain in space the respective positions of the axes of rotating spindles throughout the entire period from commencing their rotation until complete operation-wise warming up of the spindle assemblies.

In the hitherto known structures spindle heads are secured on their supports, their precise positioning being retained with aid of studs pressure-fitted in the housing of the spindle head and clamped from two sides by set screws displaceable in respective threads cut in plates rigidly secured on the support and retained with aid of play-safe pins.

This securing enables to retain rigidly the position of the spindle assembly with respect to the support structure, e.g. a bridge structure, while permitting an adjustment of the precise position of the axis of the spindle in the direction parallel with the plane of attachment of the assembly, with aid of the set screws, so that temperature-induced or thermal expansion of the housing should not result in the axis of the spindle becoming displaced with respect to the the support structure. In all the hitherto known structures the retaining pins are arranged in a plane including the axis of the spindle, which in most cases is also the axis of symmetry of the housing of the assembly. This characteristic feature of hitherto known structures, while being an asset in a spindle assembly arranged along the axis of symmetry of the support structure, becomes a drawback in case of any spindle assembly wherein the axis is offset with respect to the axis of symmetry of the support structure.

This drawback arises from the following. As a rule, every spindle assembly warms up in operation, which results in thermal expansion of not only the housing parts of the spindle assembly per se, but also of the support structure to which heat is transferred by heat conductivity from the spindle assembly. Owing to dissipation of heat, the temperature of the spindle assembly, however, is always higher than that of the support structure when the latter is influenced by no other sources of heat.

Caused by the temperature differential between the spindle assembly and the support structure of this assembly, there takes place relative displacement in the joint between the assembly and the support structure, on account of different extents of thermal expansion.

In the presence of retaining studs arranged in a plane including the axis of the spindle, this thermal displacement in the joint would not vary the position of the spindle relative to the support structure in the direction parallel with the plane of attachment; neither the position of the spindle axis in space would vary, if the axis of the spindle coincides with the axis of symmetry of the support structure.

However, if the assembly is offset with respect to the axis of symmetry of the support structure, which is typical of every multi-spindle machine, the thermal expansion of the support structure would result in the spindle axis being displaced in space, in a direction of possible support structure expansion of the axis, which might be a direction parallel with the plane of the joint between the spindle assembly and the support structure.

There is known a machine for performing high-precision boring operations, incorporating means for compensation for the thermal deformation of the machine. This known machine comprises a framework, a work table adapted to have workpieces secured thereon, movable relative to the framework in the course of a boring operation. The framework of this known machine has mounted thereon either one or two support or bridge structures, each carrying at least one spindle head with a spindle. The housing of the spindle head is attached to the side of the bridge structure, facing the work table, the housing being arranged so that the axis of the spindle is offset with respect to the axis of symmetry of the bridge structure. The housing of the spindle head is retained relative to that side of the bridge circuit where this housing is mounted, with two reference pins pressure-fitted into this housing.

It is the standard feature that the axes of the reference pins belong to a plane including the spindle axis and perpendicular to the plane of attachment of the spindle head to the bridge structure.

The design of this machine tool provides compensation for thermal deformation caused by expansion of the housing of the spindle head and by expansion of the bridge structure, but solely in the direction perpendicular to the plane of attachment of the housing to the bridge structure. However, with the commonly used arrangement of the axes of the reference pins in a plane including the axis of the spindle, although expansion of the spindle head housing in a direction parallel with the plane of attachment would not cause a displacement of the spindle axis in his direction, any thermal expansion of the bridge structure in a direction parallel with the aforesaid attachment plane would displace in space the axis of the spindle head, the more, the further this axis is from the axis of symmetry of the bridge structure. With two spindle heads arranged to both sides of the axis of symmetry of the bridge structure, the spacing of the axes of the spindles tends to increase with the heads warming up to operation temperature, which affects the accuracy of machining.

It is, therefore, the main object of the present invention to create a machine for performing high-precision boring operations, wherein there should be provided compensation for temperature-induced displacement of the axes of the spindles in a direction parallel with the plane of attachment of the spindle head to the bridge structure.

It is a further object of the present invention to create a machine of the abovedescribed type, which should offer a higher accuracy of machining, in comparison with the hitherto known machines of the kind.

These and other objects are attained by the creation of a machine for precision boring operations, with compensation for thermal deformation of the machine, comprising a framework, a work table adapted to have workpieces secured thereon, movable relative to the framework in the course of a boring operation, and either one or two bridge structures mounted on the framework, carrying each at least one head with a spindle, the housing of this spindle head being attached to the side of the bridge structure, facing the work table, so that the axis of the spindle is offset with respect of the axis of symmetry of the bridge structure, and retained relative to this side of the bridge structure with aid of pins pressure-fitted in the housing of the spindle head, in which machine, in accordance with the invention, these pins are arranged in the housing so that the plane including their axes is offset with respect to a parallel plane including the axis of the spindle, in a direction opposite to that toward the axis of symmetry of the bridge structure.

Owing to the abovespecified arrangement of the reference pins, there is attained mutual compensation for expansion of the housing of the spindle head and that of the bridge structure in a direction parallel to the plane of attachment of the head, by subtraction of the value of thermal expansion of the asymmetrically retained housing of the spindle head, tending to displace the spindle axis toward the axis of symmetry of the bridge structure, from the value of thermal expansion of the bridge structure, tending to displace the spindle axis in the opposite direction.

It is most expedient that the value of the spacing of the plane including the axis of the spindle from the plane including the axis of symmetry of the bridge structure, and the value of the spacing of the plane including the axes of the pins from the plane including the axis of the spindle should be related according to the expression:

$$a = b\, t_2 \cdot k_2/t_1 \cdot k_1,$$

where $a$ is the value of the spacing of the plane including the axes of the pins from the plane including the axis of the spindle, $b$ — is the value of the spacing of the plane including the axis of the spindle from the plane including the axis of symmetry of the bridge structure, $t_1$ — is the maximum temperature of warming up in operation of the housing of the spindle head at a permanent rpm value of the spindle, $t_2$ — is the maximum temperature of warming up in operation of the bridge structure at the same rpm value of the spindle, $k_1$ — is the thermal expansion factor of the material of the spindle head housing, and $k_2$ — is the thermal expansion factor of the material of the bridge structure.

If the aforesaid relationship is observed, there is attained complete mutual compensation for thermal expansion of the spindle head housing and that of the bridge structure in a direction parallel with the plane of attachment of the heads, which ensures accurate retaining of the positions of the spindles of the boring heads in space.

While the hitherto known structure would provide for retaining the accuracy of the positioning of the axis of a boring spindle in space within a 3 micromillimeter range, in the period between starting the spindle and attaining the operation temperature of the spindle head housing, the incorporation of the herein disclosed structure curbs down this possible temperature-induced displacement of the spindle axis to 2 micromillemeters, which is tantamount to significantly stepped up precision of the working of high-precision components of machine and instrument parts.

Figure 1:
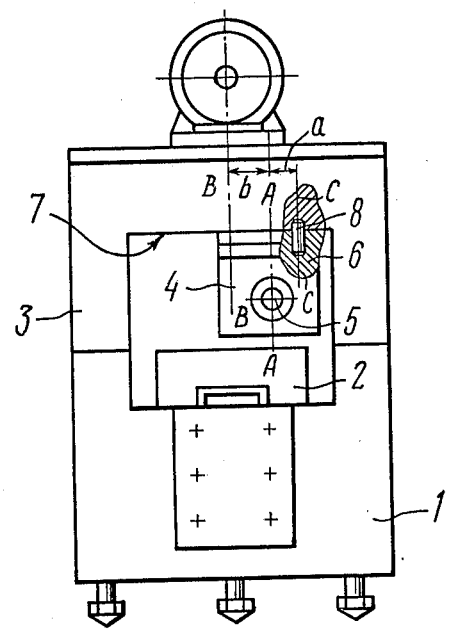

The present invention will be hereinbelow described in connection with a description of its preferred embodiments, with reference being had to the accompanying drawings, wherein:

FIG. 1 illustrates a general view of a machine for performing high-precision boring operations, constructed in accordance with the invention, wherein one spindle head is offset with respect to the axis of symmetry of the bridge structure, and the axes of the pins are offset with respect to the plane including the axis of the spindle (the second pin, not visible in the drawing, is at the opposite side of the head);

FIG. 2 illustrates a general view of a machine for performing high-precision boring operations, wherein two spindles are disposed to both sides of the axis of symmetry of the bridge circuit, the distances between the axes of the pins, the axes of the heads and the axis of symmetry of the bridge structure being related, in accordance with the invention, by a relationship providing for substantially complete compensation for thermal expansion in a direction parallel with the plane of attachment of the heads to the bridge structure.

Referring now to the drawings, the disclosed machine for performing high-precision boring operations (see FIG. 1) comprises a framework 1, a work table 2 adapted to have workpieces to be machined secured thereon, movable relative to the framework 1 in the course of a boring operation, and two bridge structures 3 mounted on the framework 1. Each bridge structure 3 carries a spindle head 4 with a spindle 5. The housing 6 of the spindle head 4 is mounted on a side 7 of the bridge structure 3, facing the work table 2, so that the axis A—A of the spindle 5 is offset with respect to the axis B—B of symmetry of the bridge structure 3. Furthermore, the housing 6 of the spindle head 4 is retained in position with two pins 8 governing and monitoring the position of the spindle head 4 with respect to the bridge structure 3. The second pin 8 (not shown in the drawing) is at the opposite side of the spindle head 4.

According to the invention, the pins 8 are arranged in the housing 6 of the spindle head 4 so that a plane including their axes C—C is offset with respect to a parallel plane including the axis A—A of the spindle 5, in a direction opposite to that toward the axis B—B of symmetry of the bridge structure 3.

Thus, this fact that the axis C—C is offset with respect to the axis A—A results in that with the housing 6 of the spindle head 4 warming up in operation, the axis A—A of the spindle tends to be displaced in a direction parallel with the plane of attachment of the head 4 to the bridge structure 3, toward the axis B—B of symmetry of the bridge structure 3, which ensures that the value of this displacement is subtracted from the value of the opposite temperature-induced displacement of the axis of the spindle head, caused by thermal expansion of the bridge structure 3.

In the cases illustrated in FIGS. 1 and 2, the pins 8 are spaced and arranged according to the relationship:

$$a = b\, t_2 \cdot k_2/t_1 \cdot k_1,$$

where $a$ — is the value of the spacing of the plane including the axes of the pins from the plane including the axis of the spindle, $b$ — is the value of the spacing of the plane including the axis of the spindle from the plane including the axis of symmetry of the bridge structure, $t_1$ — is the maximum relative temperature of warming up in operation of the housing of the spindle head at a permanent rpm value of the spindle, $t_2$ — is the maximum relative temperature of warming up in operation of the bridge structure at the same rpm value of the spindle, $k_1$ — is the factor of thermal expansion of the material of the spindle head housing, and $k_2$ — is the factor of thermal expansion of the material of the bridge structure.

With the aforesaid relationship observed, the opposingly directed values of temperature-induced displacement of the axes of the spindle heads, caused, on the one hand, by the warming up of the spindle head housings and, on the other hand, by the warming up of the bridge structure, annihilate each other, or, in other words, are mutually compensated for.

The retaining pins 8 are pressure-fitted in the housing 6 at the distance "a" from the plane including the axis A—A of the spindle 5, in a direction opposite to that toward the axis C—C of symmetry of the bridge structure 3.

If the spindle head 4 is mounted on the bridge structure 3 so that the spacing of the axis A—A of the spindle 5 from the axis C—C of symmetry of the bridge structure 3 equals "b", and when the ratio of the temperature $t_1$ of warming up in operation of the spindle head 4 to the temperature $t_2$ of warming up in operation of the bridge structure 3 is known, the value "a" can be determined from the expression $$a = b\, t_2/t_1.$$

Then, as it has been already explained, the displacement of the axis A—A of the spindle 5 in a direction parallel with the plane of attachment of the housing 6 to the bridge structure 3, caused by thermal expansion of the latter, and the displacement of the same axis in the opposite direction, caused by the displacement of the housing 6 on account of different temperatures of warming up of the housing 6 and of the bridge structure 3, are equal by their values and opposite by their directions.

It is understood in the above explanation that the housing 6 and the bridge structure 3 are made of the same material, e.g. cast iron, and have the same thermal expansion factor; it is likewise presumed that the temperature $t_2$ of warming up of the bridge structure 3 is positively lower than the temperature $t_1$ of warming up of the housing 6 of the spindle head 4 wherein the rotary bearings of the spindle 5 are a source of heat.

Should the housing 6 and the bridge structure 3 be made of different materials, the last-quoted expression has a correction introduced thereinto for the ratio of the thermal expansion factors of these materials, and the expression becomes that already described, i.e.

$$a = b\, t_2 \cdot k_2/t_1 \cdot k_1,$$

where $k_1$ and $k_2$ — are the two thermal expansion factors.

Therefore, owing to the equality in value and opposite directions of the two components of temperature-induced displacement of the axis of the spindle in a direction parallel with the plane of attachment of the head, there is automatically effected compensation for temperature-induced deformation of the herein described type.

The present invention enables to compensate for temperature-induced deformation of the bridge structure, which otherwise would have caused displacement of the axis of a spindle head offset by a given distance from the axis of symmetry of the bridge structure in a direction parallel with the plane of attachment of the spindle head to the bridge structure.

What is claimed is:

1. A machine for performing high-precision boring operations with compensation for its temperature-induced deformation, comprising: a framework; a work table adapted to have workpieces to be machined secured thereon, movable relative to said framework in the course of a boring operation; a bridge structure having a side facing said work table, mounted on said framework and having an axis of symmetry; a spindle head with a spindle having its geometrical axis; the housing of said spindle head, attached to said side of said bridge structure, facing said work table, so that the axis of the spindle of said spindle head is offset with respect to the axis of symmetry of said bridge structure; pins adapted to retain the position of said housing of said spindle head relative to said side of said bridge structure, facing said work table, pressure-fitted in said housing of said spindle head and arranged in said housing so that a plane including the geometrical axes of said pins is offset with respect to a parallel plane, including the axis of said spindle, in a direction opposite to that toward the axis of symmetry of said bridge structure.

2. A machine for performing high-precision boring operations with compensation for its temperature-induced deformation, comprising: a framework; a work table adapted to have workpieces to be machined secured thereon, movable relative to said framework in the course of a boring operation; two bridge structures, each having an axis of symmetry and a side facing said work table, mounted on said framework; spindle heads carrying each a spindle having its geometrical axis; respective housings of said spindle heads, attached to the sides of said bridge structures, facing said work table, so that the geometric axis of each spindle of each said spindle head is offset with respect to the axis of symmetry of each said respective bridge structure, to which said respective spindle head is attached; pins adapted to retain the positions of said housings of said spindle heads relative to the respective ones of the sides of said bridge structures, facing said work table, pressure-fitted into the respective ones of said housings of said spindle heads and arranged in said respective housing so that the plane including the geometric axes of said pins is offset with respect to parallel planes including the axes of said spindles in a direction opposite to that toward the respective axes of symmetry of said bridge structures.

3. A machine as set forth in claim 1, wherein the value of the spacing of the plane including the axis of the spindle from the plane including the axis of symmetry of the bridge structure, and the value of the spacing of the plane including the axes of the pins from the plane including the axis of said spindle are interrelated according to an expression:

$$a = b\, t_2 \cdot k_2/t_1 \cdot k_1,$$

where $a$ — is the value of the spacing of the plane including the axes of the pins from the plane including the axis of the spindle;

$b$ — is the value of the spacing of the plane including the axis of the spindle from the plane including the axis of symmetry of the bridge structure;

$t_1$ — is the maximum temperature of warming up in operation of the housing of the spindle head at $t_2$ a permanent rpm value of the spindle, $t_2$ — is the maximum temperature of warming up in operation of the bridge structure at the same permanent rpm value of the spindle, $k_1$ — is the thermal expansion factor of the material of the spindle head housing, and $k_2$ — is the thermal expansion factor of the material of the bridge structure.

4. A machine as set forth in claim 2, wherein the value of the spacing of the plane including the axis of the spindle from the plane including the axis of the symmetry of the bridge structure and the value of the spacing of the plane including the axes of the pins from the plane including the axis of said spindle are interrelated according to the expression:

$$a = b\, t_2 \cdot k_2 / t_1 \cdot k_1,$$

where $a$ — is the value of the spacing of the plane including the axes of the pins from the plane including the axis of the spindle;

$b$ — is the value of the spacing of the plane including the axis of the spindle from the plane including the axis of symmetry of the bridge structure;

$t_1$ — is the maximum temperature of warming up in operation of the housing of the spindle head at a permanent rpm value of the spindle;

$t_2$ — is the maximum temperature of warming up in operation of the bridge structure at the same permanent rpm value of the spindle;

$k_1$ — is the thermal expansion factor of the material of the spindle head housing;

$k_2$ — is the thermal expansion factor of the material of the bridge structure.

* * * * *